| (12) | United States Patent | (10) Patent No.: | US 9,216,542 B2 |
|---|---|---|---|
| | Washebeck | (45) Date of Patent: | Dec. 22, 2015 |

(54) ELECTRICAL CONNECTION BETWEEN SEALING COIL AND VOLTAGE SOURCE

(75) Inventor: Richard J. Washebeck, North Prairie, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1092 days.

(21) Appl. No.: 12/424,928

(22) Filed: Apr. 16, 2009

(65) Prior Publication Data

US 2009/0266812 A1    Oct. 29, 2009

Related U.S. Application Data

(60) Provisional application No. 61/047,256, filed on Apr. 23, 2008.

(51) Int. Cl.
*B23K 13/01*    (2006.01)
*H05B 6/10*    (2006.01)
(Continued)

(52) U.S. Cl.
CPC ............ *B29C 66/8167* (2013.01); *B29C 65/36* (2013.01); *B29C 66/53461* (2013.01); *B29C 66/80* (2013.01); *B29C 66/84123* (2013.01); *B29C 66/876* (2013.01); *B29C 66/8742* (2013.01); *B65B 7/2878* (2013.01); *B65B 51/227* (2013.01); *B29C 65/3656* (2013.01); *B29C 65/3668* (2013.01); *B29C 66/72321* (2013.01); *B29C 66/967* (2013.01); *B29L 2031/36* (2013.01); *B29L 2031/712* (2013.01);
(Continued)

(58) Field of Classification Search
CPC ............ H05B 6/42; H05B 6/04; H05B 6/362; B29C 65/36; B29C 65/3656; B21B 15/0085; B23K 1/002; B23K 13/00

USPC ......... 219/633, 632, 661, 677, 660, 603, 604, 219/615–617
See application file for complete search history.

(56) References Cited

U.S. PATENT DOCUMENTS 3,549,440 A    12/1970 Adcock
4,936,943 A    6/1990 Kubis et al.
(Continued)

FOREIGN PATENT DOCUMENTS

DE    8812537 U1    2/1990
EP    0350601 A2    1/1990
EP    1228853 A2    8/2002

OTHER PUBLICATIONS

EP Search Report issued Mar. 30, 2011 in EP Application No. 09158476.

(Continued)

*Primary Examiner* — Dana Ross
*Assistant Examiner* — Hemant Mathew
(74) *Attorney, Agent, or Firm* — Panitch Schwarze Belisario & Nadel LLP

(57) ABSTRACT

An apparatus is provided for foil sealing containers and includes a sealing head having a frame containing an induction coil. The frame has a mating surface with a pair of electrical contacts disposed thereon. A power supply cabinet has a mating surface with a pair of electrical contacts disposed thereon. The power supply cabinet also has a guide configured to engage the frame of the sealing head to direct alignment of the mating surfaces of the sealing head and the power supply cabinet such that the pair of electrical contacts of the sealing head make an electrical connection to the pair of electrical contacts of the power supply cabinet.

9 Claims, 7 Drawing Sheets

(51) Int. Cl.
  B29C 65/00 (2006.01)
  B65B 7/28 (2006.01)
  B65B 51/22 (2006.01)
  B29C 65/36 (2006.01)
  B65B 59/00 (2006.01)
  H01R 13/24 (2006.01)
  H01R 13/44 (2006.01)
  B29L 31/00 (2006.01)
  B29L 31/36 (2006.01)

(52) U.S. Cl.
  CPC ............... *B65B 59/00* (2013.01); *H01R 13/24* (2013.01); *H01R 13/44* (2013.01)

(56) References Cited

U.S. PATENT DOCUMENTS

| | | | |
|---|---|---|---|
| 5,025,123 A | 6/1991 | Pfaffmann et al. | |
| 6,153,864 A * | 11/2000 | Hammen et al. | 219/632 |
| 6,415,168 B1 * | 7/2002 | Putz | 600/378 |
| 6,747,252 B2 * | 6/2004 | Herzog | 219/633 |
| 6,875,965 B2 * | 4/2005 | Herzog | 219/604 |
| 2003/0062130 A1 * | 4/2003 | Hammen et al. | 156/380.6 |
| 2005/0224184 A1 * | 10/2005 | Hammen et al. | 156/379.6 |

OTHER PUBLICATIONS

Office Action issued Apr. 7, 2011 in EP Application No. 09158476.

* cited by examiner

ELECTRICAL CONNECTION BETWEEN SEALING COIL AND VOLTAGE SOURCE

CROSS-REFERENCE TO RELATED APPLICATIONS

This application claims the benefit of U.S. Provisional Application No. 61/047,256, filed Apr. 23, 2008, entitled "Electrical Connection Between Sealing Coil and Voltage Source."

BACKGROUND OF THE INVENTION

Typical foil sealing devices are mounted over a conveyor line that transports containers for sealing. The containers may be utilized to store products such as food, pharmaceuticals, beverages, and chemicals. Each of the containers is filled and provided with a cap containing a foil disk or "cap seal." The capped containers are passed under the foil sealing device, which utilizes an induction sealing coil. The sealing coil indirectly heats the foil by induction, thereby melting sealant supplied with the foil. As the sealant cools, the foil is adhered to the container.

In the past, foil sealing devices have mounted the sealing coil remotely from the power supply, making the necessary electrical connection via a cable with a circular connector. This arrangement makes coil replacement or servicing dangerous because the operator or technician would come into physical contact with the voltage source via the cable. If the power supply was not "off," the operator was exposed to a significant shock risk. Recently, some foil sealing devices have bolted the sealing coil to the power supply, but the electrical connection is still made with a cable or other mechanical-type fastener. Further, disconnecting the sealing head from the power supply requires a tool and can be tedious and time-consuming.

It is therefore desirable to provide a foil sealing device that enables fast, efficient, and safe removal of the sealing coil from the power supply.

BRIEF SUMMARY OF THE INVENTION

An apparatus is provided for foil sealing containers and includes a sealing head having a frame containing an induction coil. The frame has a mating surface with a pair of electrical contacts disposed thereon. A power supply cabinet has a mating surface with a pair of electrical contacts disposed thereon. The power supply cabinet also has a guide configured to engage the frame of the sealing head to direct alignment of the mating surfaces of the sealing head and the power supply cabinet such that the pair of electrical contacts of the sealing head make an electrical connection to the pair of electrical contacts of the power supply cabinet.

BRIEF DESCRIPTION OF THE DRAWINGS

The foregoing summary, as well as the following detailed description of preferred embodiments of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

DETAILED DESCRIPTION OF THE INVENTION

Figure 1:
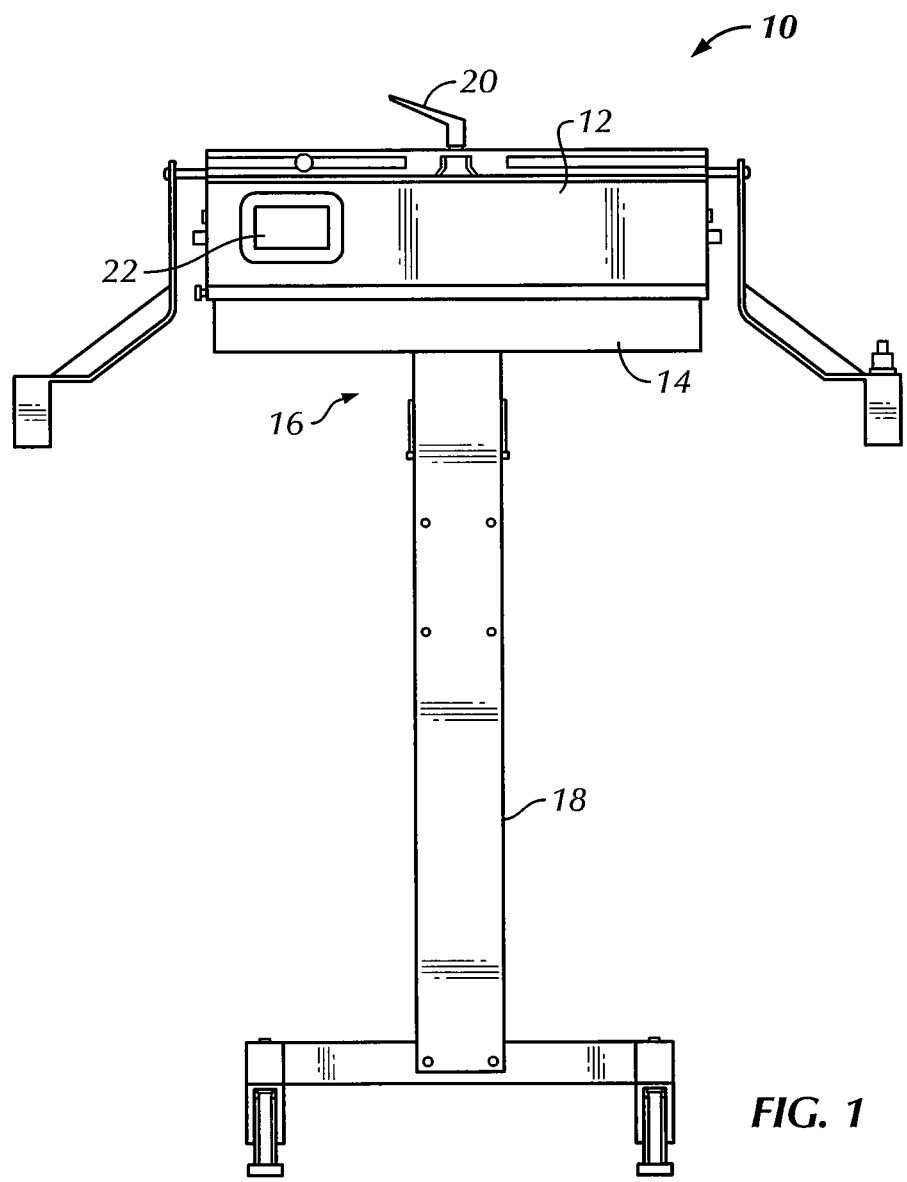
FIG. 1 is a front side elevational view of a foil sealing apparatus in accordance with preferred embodiments of the present invention.

Certain terminology is used in the following description for convenience only and is not limiting. Additionally, the words "a" and "an", as used in the claims and in the corresponding portions of the specification, mean "at least one." In the drawings, the same reference numerals indicate like elements throughout.

FIG. 1 shows a foil sealing device 10 for use in preferred embodiments of the present invention. The foil sealer 10 includes a power supply cabinet 12 operatively connected with a sealing head 14. The power supply cabinet 12 and sealing head 14 are preferably mounted on a support stand 16 having a vertical column 18 that can be adjusted in a vertical direction to allow an operator to adjust the height of the sealing head 14 for varying container heights. The support stand 16 may also permit rotation of the power supply cabinet 12 and sealing head 14 about an axis to allow for an evenly dispersed field over a container having a large diameter foil. Alternatively, the power supply 12 and sealing head 14 may be coupled to a wall or ceiling-mounted support, such as a beam or arm (not shown). A handle 20 is mounted to a top portion of the power supply cabinet 12.

The power supply cabinet 12 also includes a display 22. The display 22 is preferably a touch screen for allowing an operator to program and control the foil sealing device 10. However, other inputs may be used, such as keypads or the like, or the device 10 may be externally controlled by, for example, a computer over a direct coupling or network connection.

Figure 2:
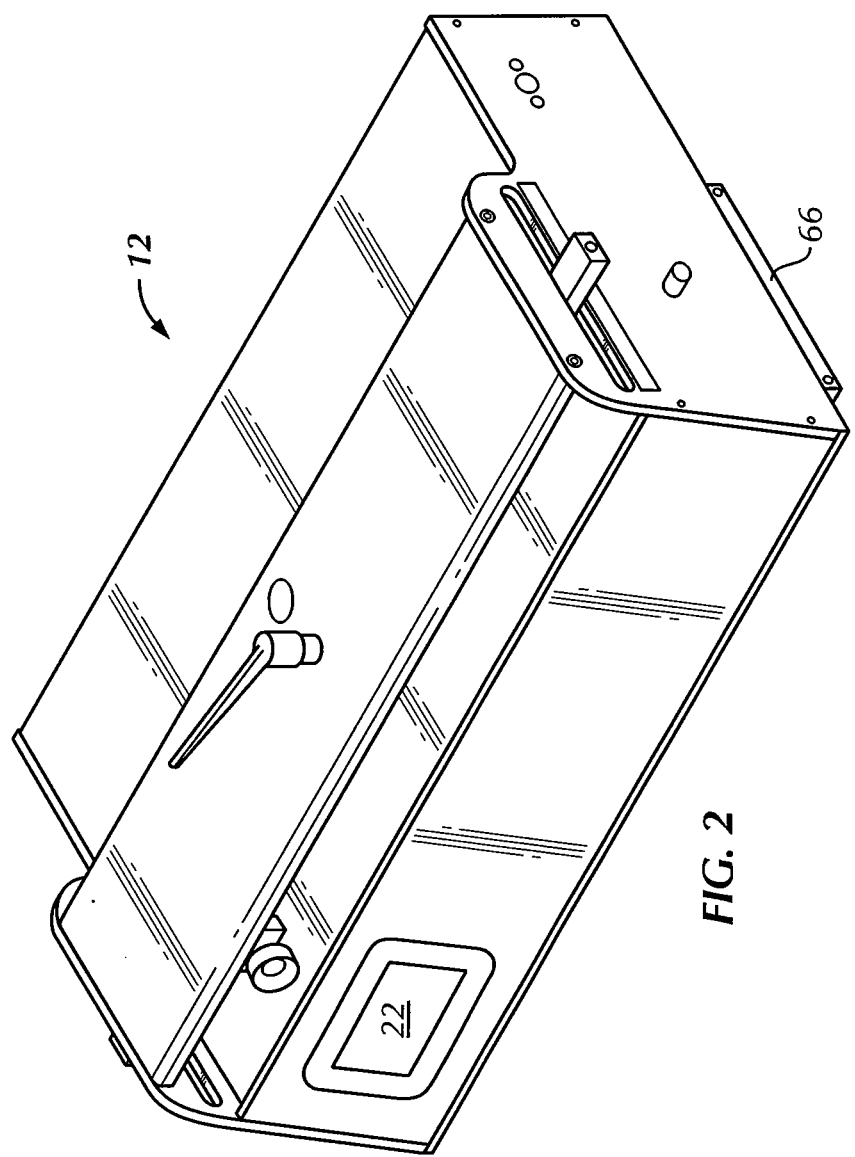
FIG. 2 is a perspective view of a power supply cabinet for use in the foil sealing apparatus of FIG. 1.
Figure 3:
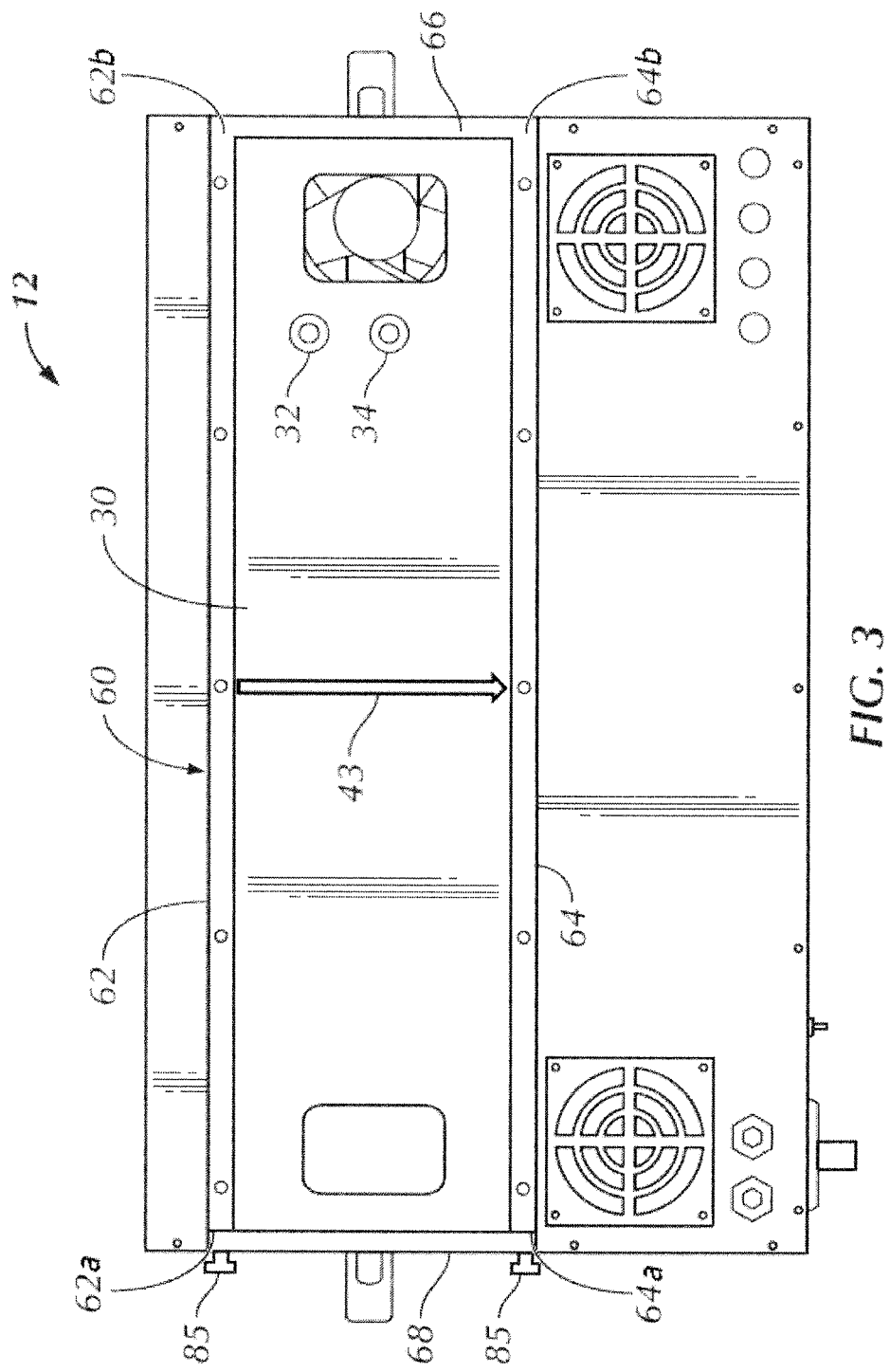
FIG. 3 is a bottom plan view of the power supply cabinet of FIG. 2.
Figure 7:
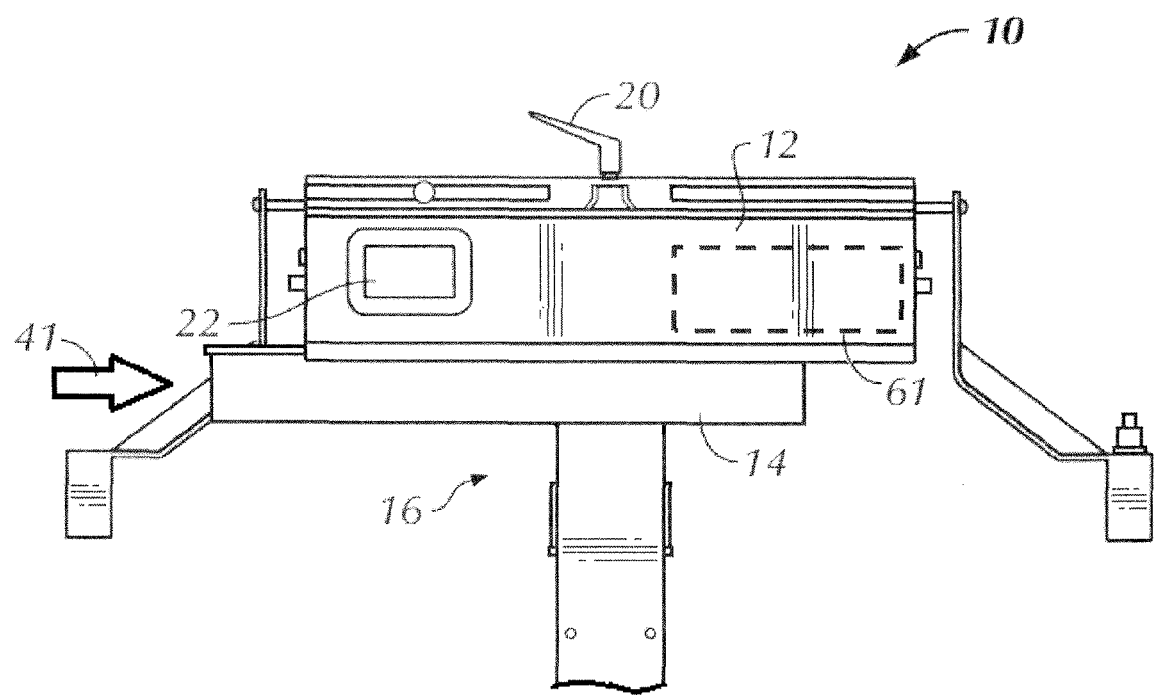
FIG. 7 is a partial front side elevational view of the foil sealing apparatus of FIG. 1 during installation of the sealing head.

FIGS. 2-3 show the power supply cabinet 12, which houses a power module 61 (shown schematically in phantom in FIG. 7) that preferably receives an alternating current (A/C) input of 240 volts (V) at 50-60 Hertz (Hz). The power module 61 provides an output to the sealing head which varies in output voltage and frequency, depending on the foil load, in a conventional manner.

The power supply cabinet 12 includes a mating surface 30, preferably located on an underside thereof (FIG. 3). A pair of electrical contacts 32, 34 (one for each polarity output of the power module 61) are disposed on the mating surface 30 for providing the electrical output to the sealing head 14. The electrical contacts 32, 34 of the power supply cabinet 12 are preferably metal plates electrically connected to the power module 61. The metal for the electrical contacts 32, 34 of the power supply cabinets is preferably stainless steel, but may also be copper, brass, or other metal alloys capable of handling high voltage current. The contacts 32, 34 are preferably located on an even plane with the mating surface 30 of the power supply cabinet 12.

Figure 4:
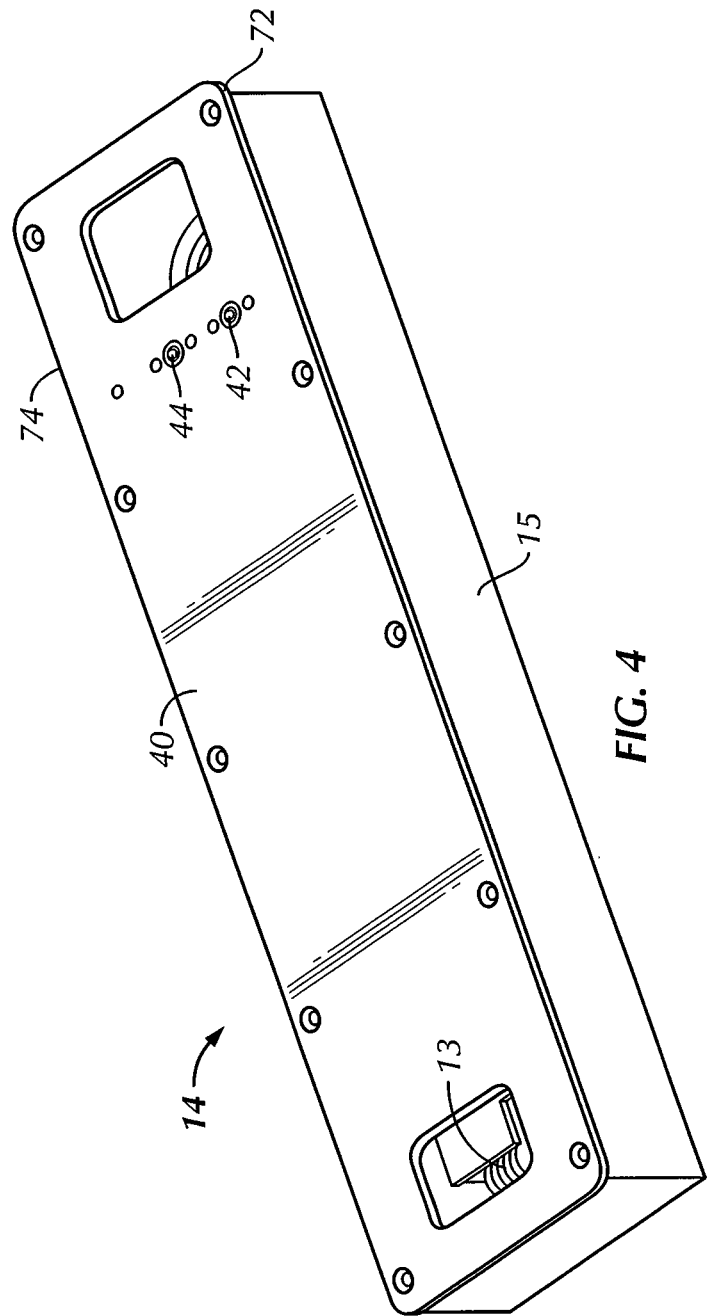
FIG. 4 is a perspective view of a sealing head for use in the foil sealing apparatus of FIG. 1 in accordance with a preferred embodiment of the present invention.

FIG. 4 shows the sealing head 14, which has a frame 15 containing an induction sealing coil 13. The frame 15 is preferably manufactured from plastic or other non-metallic material. The sealing coil 13 is preferably constructed of a copper litz wire, although other types of conducting material may be used. A ferrite core (not shown) and resonant capacitors (not shown) are utilized with the sealing coil 13 in a conventional manner. The frame 15 includes a mating surface 40, preferably located on a top side thereof, for coupling to the corresponding mating surface 30 of the power supply cabinet 12. The mating surface 40 of the sealing head 14 also includes a pair of electrical contacts 42, 44 disposed thereon for receiving the electrical output of the power module 61.

The electrical contacts 42, 44 of the sealing head 14 are preferably made from stainless steel. Further, in order to ensure a proper connection between the respective pairs of electrical contacts 32, 34, 42, 44 without requiring operator intervention for alignment or physical connection (such as with pin and socket type contacts), the electrical contacts 42, 44 of the sealing head 14 are preferably spring-loaded ball plungers that are configured to be resiliently urged against the respective contacts 32, 34 of the power supply cabinet 12. The contacts 42, 44 may also have other types resilient configurations, such as being retractable, spring-loaded, or the like. The contacts 42, 44 are preferably located slightly above a plane of the mating surface 40 of the sealing head 14. Alternatively, the contacts 32, 34 of the power supply cabinet 12 may be resiliently configured and the contacts 42, 44 of the sealing head 14 may be metal plates.

Figure 5:
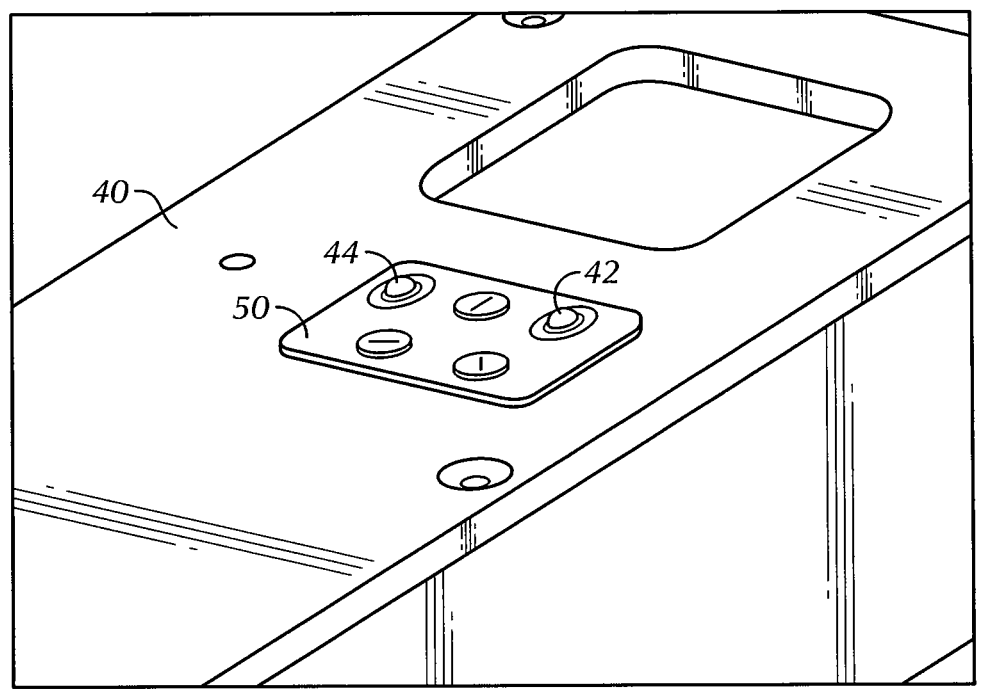
FIG. 5 is an enlarged partial perspective view of a sealing head for use in the foil sealing apparatus of FIG. 1 in accordance with another preferred embodiment of the present invention.

In certain preferred embodiments, the electrical contacts 42, 44 are mounted directly to the mating surface 40 of the sealing head 14, as shown in FIG. 4. For example, the contacts 42, 44 may include a fastening portion (not shown) disposed beneath the mating surface 40 that receives one or more screws or fasteners to secure the contacts 42, 44 to the underside of the mating surface 40. The contacts 42, 44 may also be threaded to match a corresponding threaded receptacle in the mating surface 40. In other embodiments (FIG. 5), a sub-plate 50 may be mounted to the mating surface 40 of the sealing head, wherein the electrical contacts 42, 44 are mounted to the sub-plate 50 rather than directly to the mating surface 40.

Referring again to FIG. 3, the power supply cabinet 12 includes a guide 60 configured to engage the frame 15 of the sealing head 14 to direct alignment of the mating surface 30 of the power supply cabinet 12 and the mating surface 40 of the sealing head 14 such that the pair of electrical contacts 32, 34 of the sealing head 14 make an electrical connection to the pair of electrical contacts 42, 44 of the power supply cabinet 12. In the preferred embodiment of FIG. 3, the guide 60 includes a pair of guide rails 62, 64 that receive the sealing head 14. The guide rails 62, 64 each have a first end 62a, 64a and a second end 62b, 64b. The guide rails 62, 64 extend between their respective first and second ends 62a, 62b, 64a, 64b in a first direction (shown by arrow 41 in FIG. 7) that is parallel to the mating surface 30 of the power supply cabinet 12. The guide rails 62, 64 are also spaced apart from one another in a second direction (shown by arrow 43 in FIG. 3) that is perpendicular to the first direction 41 and parallel to the mating surface 30 of the power supply cabinet 12. The guide rails 62, 64 may be secured to the power supply cabinet 12 using screws or the like, or may be integrally formed therewith. In FIG. 3 the guide rails 62, 64 are shown mounted to the mating surface 30 of the power supply cabinet 12, but the guide rails 62, 64 may be mounted elsewhere depending on the configuration of the power supply cabinet 12 and the sealing head 14. The guide 60 also preferably includes a mechanical stop 66 configured to contact the sealing head 14 when the pairs of electrical contacts 32, 34, 42, 44 are electrically connected.

The sealing head 14 preferably includes a pair of protruding surfaces 72, 74 (FIG. 4) configured to mate with the guide rails 62, 64 of the power supply cabinet 12. As shown in FIG. 4, the protruding surfaces 72, 74 are integrally formed with the mating surface 40 of the sealing head 14, which is fastened to the remainder of the frame 15. However, the protruding surfaces 72, 74 may be integrally formed with some other portion of the frame 15 or may be separately fastened or secured to the sealing head 14.

A locking mechanism 68 is also preferably utilized at the first ends 62a, 64a of the guide rails 62, 64 opposite the mechanical stop 66, which prevents movement of the sealing head 14 when the pairs of electrical contacts 32, 34, 42, 44 are electrically connected. Thus, sudden movement or jostling of the power supply cabinet 12 will not disturb the electrical connection to the sealing head 14. In certain preferred embodiments, engagement of the locking mechanism 68 enables power to be supplied from the pair of electrical contacts 32, 34 of the power supply cabinet 12. The locking mechanism 68 effectively acts as a kill-switch so that while the sealing head 14 is removed, or in the event of operator or other error, the risk of shock is reduced. The locking mechanism 68 preferably is mechanically coupled to the guide rails 62, 64 as shown in FIG. 3, but may also be mechanically coupled directly to the power supply cabinet 12. The locking mechanism 68 is preferably attached by thumb-screws 85 or the like and may be completely removable, or may include a hinge such that the locking mechanism 68 may be opened to permit placement/removal of the sealing head 14 while remaining coupled to the guide rails 62, 64 and/or the power supply cabinet 12.

Figure 6:
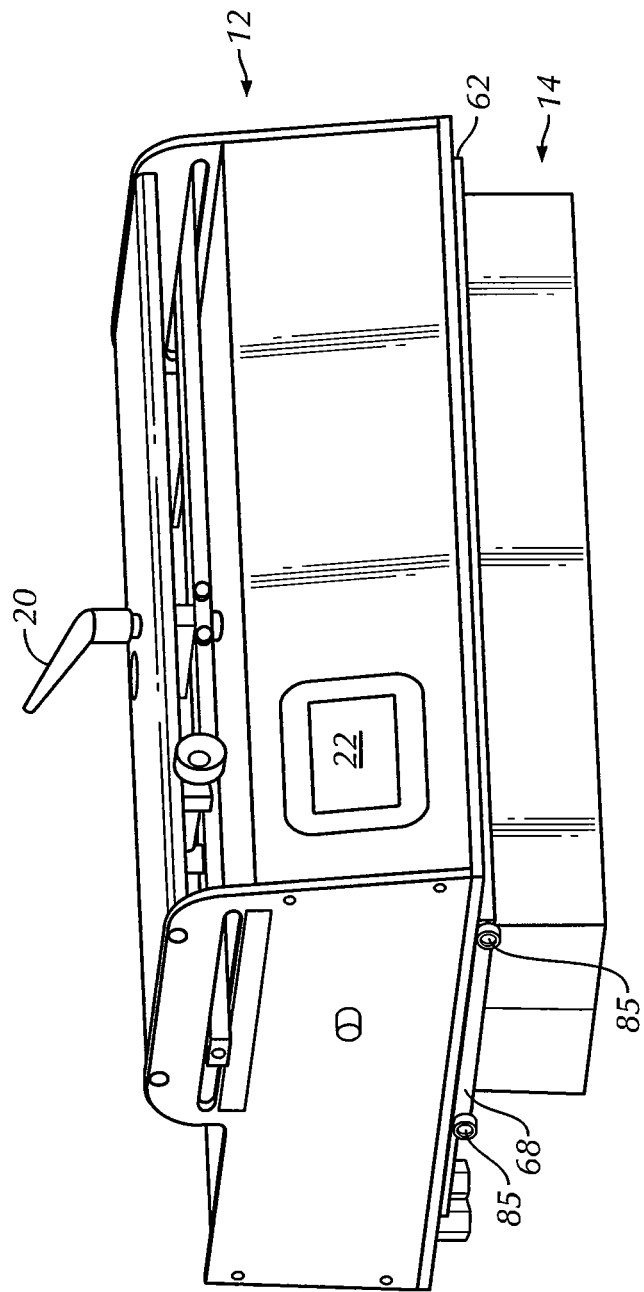
FIG. 6 is a perspective view of the sealing head of FIG. 4 operatively connected to the power supply cabinet of FIG. 2.

Assembly of the power supply cabinet 12 and sealing head 14 in accordance with a preferred embodiment will now be described. The locking mechanism 68 is removed, preferably disabling the power module. The protruding surfaces 72, 74 of the sealing head at an end proximate the electrical contacts 42, 44 are mated with the respective guide rails 62, 64 at the first ends 62a, 64a opened by the locking mechanism 68. The sealing head 14 is slid along the guide rails 62, 64 toward the mechanical stop 66 (e.g., in the first direction indicated by arrow 41 in FIG. 7). Once the sealing head 14 contacts the mechanical stop 66, the electrical contacts 42, 44 of the sealing head 14 are positioned beneath the electrical contacts 32, 34 of the power supply cabinet 12 and are engaged. The locking mechanism 68 is replaced to complete the installation. The subsequent assembly is shown in FIG. 6.

Although the guide 60 has been described as a pair of guide rails 62, 64 and a mechanical stop 66, other configurations for directing the alignment of the mating surfaces 30, 40 are within the scope of the invention, such as grooves, latches, or the like, mounted or formed on one or both of the power supply cabinet 12 and the sealing head 14.

From the foregoing, it can be seen that embodiments of the present invention comprise an apparatus for detecting a static field. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An apparatus for foil sealing containers comprising:
   (a) a sealing head including:

(1) a frame having a first mating surface,
(2) an induction coil contained within the frame, and
(3) a pair of electrical contacts disposed on the first mating surface; and (b) a power supply cabinet including:
(1) a second mating surface,
(2) a pair of parallel, spaced apart guide rails, each of the guide rails having a first end and a second end and extending between the first and second ends along a first direction parallel to the second mating surface, the guide rails being spaced apart from one another in a second direction that is perpendicular to the first direction and parallel to the second mating surface, and
(3) a pair of electrical contacts disposed on the second mating surface between the pair of guide rails and between the first and second ends of the guide rails, the guide rails being configured to engage the frame of the sealing head to direct alignment of the first and second mating surfaces such that the pair of electrical contacts of the sealing head make an electrical connection to the pair of electrical contacts of the power supply cabinet, wherein when the guide rails are engaged with the frame of the sealing head, the guide rails are configured to limit movement of the sealing head with respect to the power supply cabinet to directions parallel with the first direction.

2. The apparatus of claim 1, wherein the power supply cabinet further includes a removable locking mechanism arranged at the first ends of the guide rails and configured to prevent movement of the sealing head when the pair of electrical contacts of the sealing head are electrically connected to the pair of electrical contacts of the power supply cabinet.

3. The apparatus of claim 2, wherein engagement of the locking mechanism enables power to be supplied from the pair of electrical contacts of the power supply cabinet.

4. The apparatus of claim 1, wherein the sealing head further includes a pair of protruding surfaces configured to mate with the guide rails of the power supply cabinet.

5. The apparatus of claim 1, wherein the guide rails further include a mechanical stop proximate the second ends thereof configured to contact the sealing head when the pair of electrical contacts of the sealing head are electrically connected to the pair of electrical contacts of the power supply cabinet.

6. The apparatus of claim 1, wherein the pair of electrical contacts of the sealing head are spring-loaded ball plungers configured to be resiliently urged against the pair of electrical contacts of the power supply cabinet.

7. The apparatus of claim 6, wherein the pair of electrical contacts of the power supply cabinet are metal plates.

8. The apparatus of claim 1, wherein the pair of electrical contacts of the sealing head are mounted directly to the first mating surface.

9. The apparatus of claim 1, wherein the pair of electrical contacts of the sealing head are mounted onto a sub-plate that is mounted to the first mating surface.

\* \* \* \* \*